US008302390B2

(12) United States Patent
Ivens et al.

(10) Patent No.: US 8,302,390 B2
(45) Date of Patent: Nov. 6, 2012

(54) TURBO CONTROL VALVE UTILIZING A PERMANENT MAGNET

(75) Inventors: Kirk Ivens, Chatham (CA); Stavros Tsokonas, Chatham (CA)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 1903 days.

(21) Appl. No.: 10/951,516

(22) Filed: Sep. 28, 2004

(65) Prior Publication Data

US 2006/0064980 A1 Mar. 30, 2006

(51) Int. Cl.
*F01N 1/00* (2006.01)

(52) U.S. Cl. .......... 60/324; 60/274; 60/280; 251/129.09

(58) Field of Classification Search .................... 60/280, 60/324, 602, 611, 274; 137/625.65; 251/129.21, 251/129.09, 129.15, 129.16
See application file for complete search history.

(56) References Cited

U.S. PATENT DOCUMENTS 3,379,214 A * 4/1968 Weinberg ................... 137/625.5
3,814,376 A * 6/1974 Reinicke ......................... 251/65
4,050,477 A * 9/1977 Acar ........................ 137/625.65
4,350,182 A * 9/1982 Gottling et al. .......... 137/625.27
4,561,629 A * 12/1985 Idogaki et al. .................. 251/65
4,582,294 A * 4/1986 Fargo ........................ 251/129.15
4,690,371 A * 9/1987 Bosley et al. ................... 251/65
4,988,074 A * 1/1991 Najmolhoda ............ 251/129.08
5,038,826 A * 8/1991 Kabai et al. .............. 137/625.65
5,651,501 A * 7/1997 Maley et al. .................... 239/88
5,651,530 A * 7/1997 Krimmer et al. ......... 251/129.21
5,937,983 A * 8/1999 Martin et al. .............. 192/58.61
6,178,956 B1 * 1/2001 Steinmann et al. ...... 123/568.21
6,199,587 B1 * 3/2001 Shlomi et al. .............. 137/625.5
6,263,672 B1 * 7/2001 Roby et al. ................... 60/605.2
6,378,556 B1 * 4/2002 Fondse ..................... 137/625.48
6,604,497 B2 * 8/2003 Buehrle et al. ............. 123/90.12
6,752,371 B2 * 6/2004 Herbert et al. .................. 251/54
2005/0056800 A1 * 3/2005 Modien ........................... 251/64

* cited by examiner

*Primary Examiner* — Thomas Denion
*Assistant Examiner* — Diem Tran

(57) ABSTRACT

A valve for controlling a wastegate actuator of a turbocharger. The valve includes a bobbin having a coil for generating a magnetic field and a stator having a top portion and an internal channel. The valve also includes a housing having a compressor port, a wastegate actuator port and an atmospheric port. The housing also includes a pair of walls for enabling movement of a permanent magnet between a first position wherein a magnetic attraction is formed between the top portion and the magnet to seal the internal channel to enable substantially equal boost pressure levels in the compressor and the wastegate actuator ports. The magnet is also movable to a second position wherein a magnetic field is generated by the coil for repelling the magnet to unseal the internal channel to enable a portion of the boost pressure level to be vented to atmosphere.

9 Claims, 2 Drawing Sheets

TURBO CONTROL VALVE UTILIZING A PERMANENT MAGNET

FIELD OF THE INVENTION

This invention relates to valves for controlling turbochargers used in internal combustion engines, and more particularly, to a turbo control valve which utilizes permanent magnet technology.

BACKGROUND OF THE INVENTION

A turbocharger is frequently used to increase the power output of an internal combustion engine. The turbocharger includes a turbine which is connected by a shaft to a compressor that is located between an air filter and an intake manifold. The turbocharger is typically mounted to an exhaust manifold of the engine such that exhaust gases from the engine cylinders cause the turbine and thus the compressor to spin. The compressor then pressurizes the air going into the engine cylinders to provide an elevated boost pressure which causes an increase in the power generated by the engine. Further, as engine speed is increased, more exhaust gases are generated thereby increasing boost pressure.

It is desirable to control the amount of boost pressure that is generated in order to reduce the likelihood of the occurrence of undesirable engine conditions such as engine knock. A method that is used to control boost pressure includes the use of a wastegate device. The wastegate device includes a door or flap which is opened at the appropriate time to allow exhaust gases to bypass the turbine. This causes the rotational speed of the turbine and the compressor to decrease, resulting in a decrease in the boost pressure level.

A wastegate actuator is used to control the opening and closing of the wastegate device. In many vehicles, the wastegate actuator is controlled by a solenoid. Many engines today are becoming smaller in capacity, resulting in smaller capacity alternators and thus less electrical power which is available for energizing such solenoids. Further, the amount of space available in current vehicle engine compartments is limited. Therefore, there is a need for solenoids which are smaller in size and which require less power for operation.

SUMMARY OF THE INVENTION

A valve for controlling a wastegate actuator of a turbocharger having a compressor is disclosed. The valve includes a bobbin having a coil for generating a magnetic field. The valve also includes a stator which extends through the bobbin, wherein the stator includes a top portion and an internal channel. A permanent magnet is located adjacent the top portion. When the coil is de-energized, a magnetic attraction is formed between the top portion and the permanent magnet causing the permanent magnet to contact the top portion, thus sealing the internal channel. This enables substantially equal boost pressure levels to occur in compressor and wastegate actuator ports of the valve.

When the coil is energized, a magnetic field is generated which repels the permanent magnet to a position above the top portion to thus unseal the top portion and the internal channel. This enables a portion of the boost pressure level to be vented to atmosphere.

The features of the invention believed to be novel are set forth with particularity in the appended claims. The invention itself, however, both as to organization and method of operation, may be best understood by reference to the following description taken in conjunction with the accompanying figures.

DETAILED DESCRIPTION OF THE INVENTION

Figure 1:
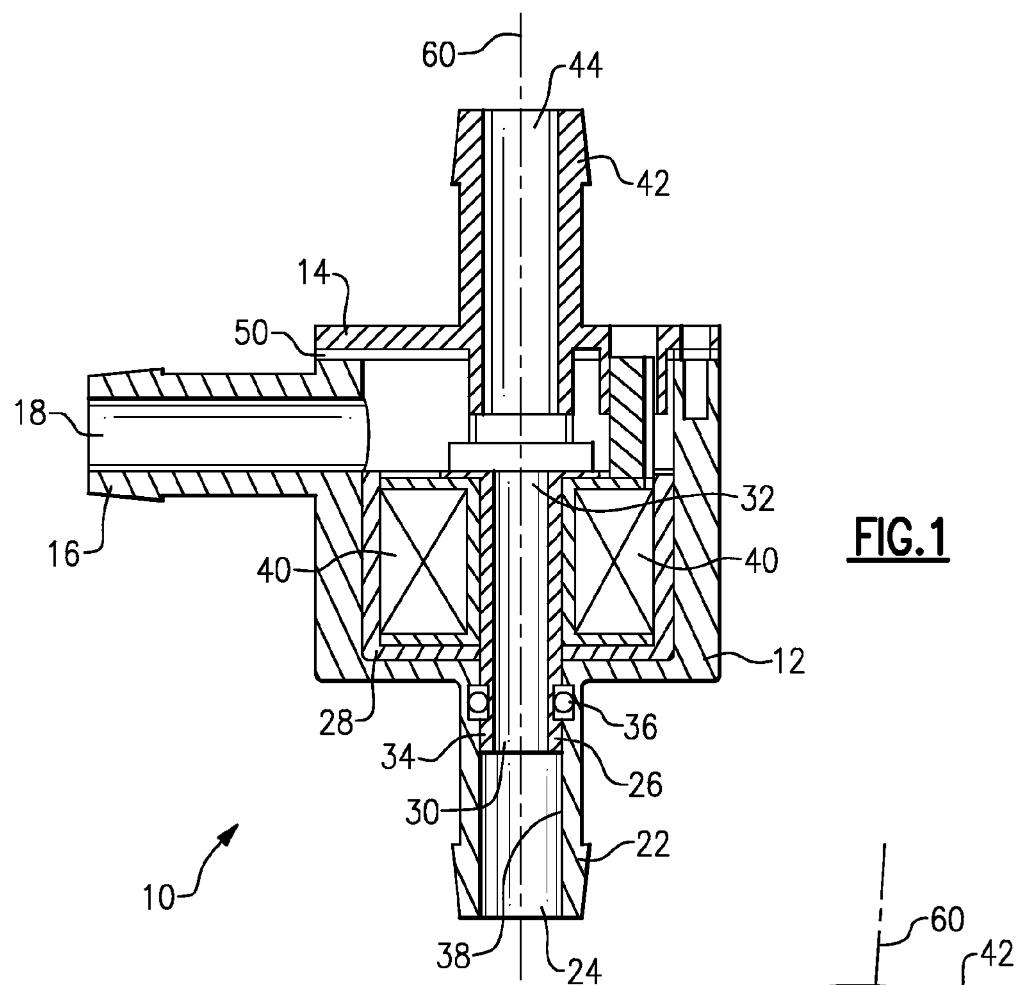
FIG. 1 a partial cross sectional view of a turbo control valve in accordance with the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of FIGS. 1-3.

Referring to FIG. 1, a partial cross sectional view of a turbo control valve 10 in accordance with the present invention is shown. The valve 10 includes a substantially U-shaped lower housing 12 and a valve lid 14. The housing 12 includes a wastegate actuator port 16 having a wastegate passageway 18 that is in fluid communication with a wastegate actuator 20. The housing 12 also includes an atmospheric bleed port 22 having an atmospheric passageway 24 that enables venting of boost pressure to atmosphere as will be described.

The valve 10 further includes a stator 26 that extends through a bobbin 28. The stator 26 includes a stator passageway 30 that extends through the stator 26 between top 32 and lower 34 portions to form a flow-through stator. The stator 26 extends into the atmospheric passageway 24 and is in fluid communication with the atmospheric port 22. A sealing element 36 such as an O-ring is affixed between the stator 26 and an inner wall 38 of the atmospheric port 22. The bobbin 28 includes a coil 40 suitable for forming a predetermined magnetic field and is fabricated from a ferromagnetic material such as steel. In one embodiment, the housing 12 includes a connector which serves to transmit electrical power from a power source to the coil 40 for forming the magnetic field.

Figure 2:
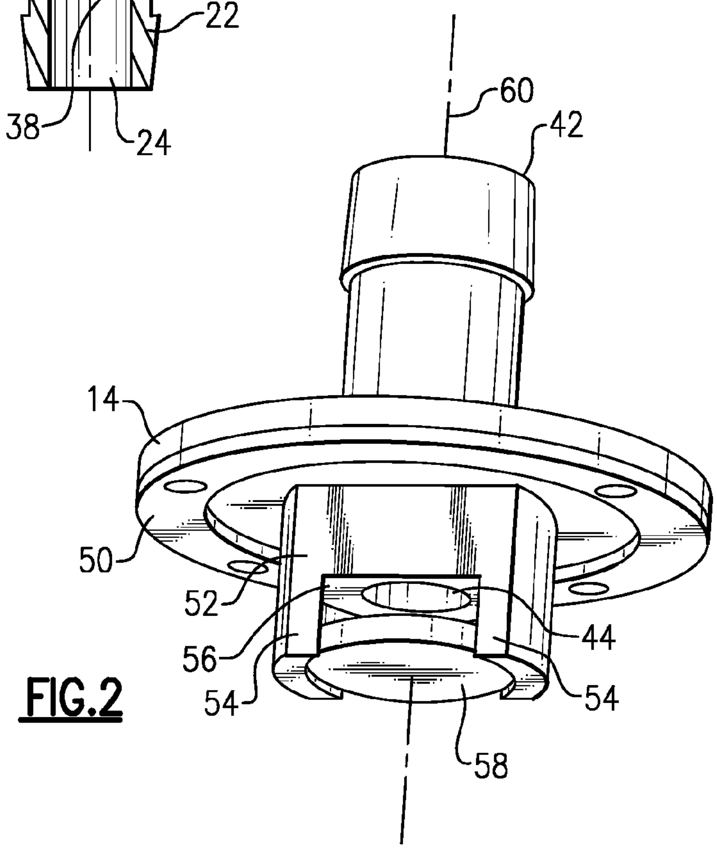
FIG. 2 is a bottom perspective view of the lid of the turbo control valve.

The lid 14 includes a compressor port 42 having a compressor passageway 44 that is in fluid communication with a compressor 46 of a turbocharger 48. The compressor passageway 44 is also in fluid communication with the wastegate actuator port 16. A sealing element 50 such as a gasket is located between the lid 14 and housing 12 to seal the valve 10. Referring to FIG. 2 in conjunction with FIG. 1, a bottom perspective view of the lid 14 is shown. The lid 14 includes an armature capture element 52 having a pair of downwardly extending walls 54 which are spaced apart to form a cavity 56. A permanent magnet, which serves as an armature 58, is located within the cavity 56. The armature 58 is movable between first and second positions relative to the stator 26. The walls 54 are shaped for guiding the armature 58 when the armature 58 moves such that the armature 58 maintains a substantially perpendicular orientation with respect to a center axis 60 of the valve 10.

In the first position, the armature 58 contacts the top portion 32 of the stator 26 to thus seal the stator passageway 30 as shown in FIG. 1. In the second position, the armature 58 is moved above the top portion 32 of the stator passageway 30 to thus open the stator passageway 30. In one embodiment, the armature 58 is disc shaped and the walls 54 are arcuately shaped to correspond to the shape of the armature 58, although it is understood that other shapes may be used.

Operation of the valve 10 will now be described. When the coil 40 is not energized, magnetic attraction between the armature 58 and the top portion 32 moves the armature 58 to the first position. This seals the stator passageway 30 and the atmospheric port 22. As a result, the boost pressure level within the wastegate passageway 18 is substantially equivalent to pressure level in the compressor passageway 44 and thus subjects the wastegate actuator 20 to the boost pressure that is generated by the compressor 48. By way of example, 80 kPa of boost pressure may be generated by the compressor 48 during operation. When the armature 58 is in the first position, the wastegate actuator 20 is also subjected to 80 kPa.

In accordance with the present invention, the magnetic attraction between the armature 58 and the top portion 32 eliminates the need for a spring as in a conventional turbo control valve, thus reducing complexity and the overall size of the valve 10. Further, electrical power is not needed to maintain the armature 58 in the first position.

The coil 40 is configured such that when energized, a magnetic field is formed which repels the armature 58 and overcomes the magnetic attraction between the armature 58 and the top portion 32 of the stator 26. This moves the armature 58 to the second position and unseals the atmospheric port 22, thus enabling some of boost pressure generated by the compressor 46 to vent to atmosphere through the stator 30 and atmospheric 24 passageways. As a result, the pressure in the wastegate passageway 18 is reduced, thus subjecting the wastegate actuator 20 to a reduced pressure which is used to control the wastegate device 60 accordingly.

Figure 3:
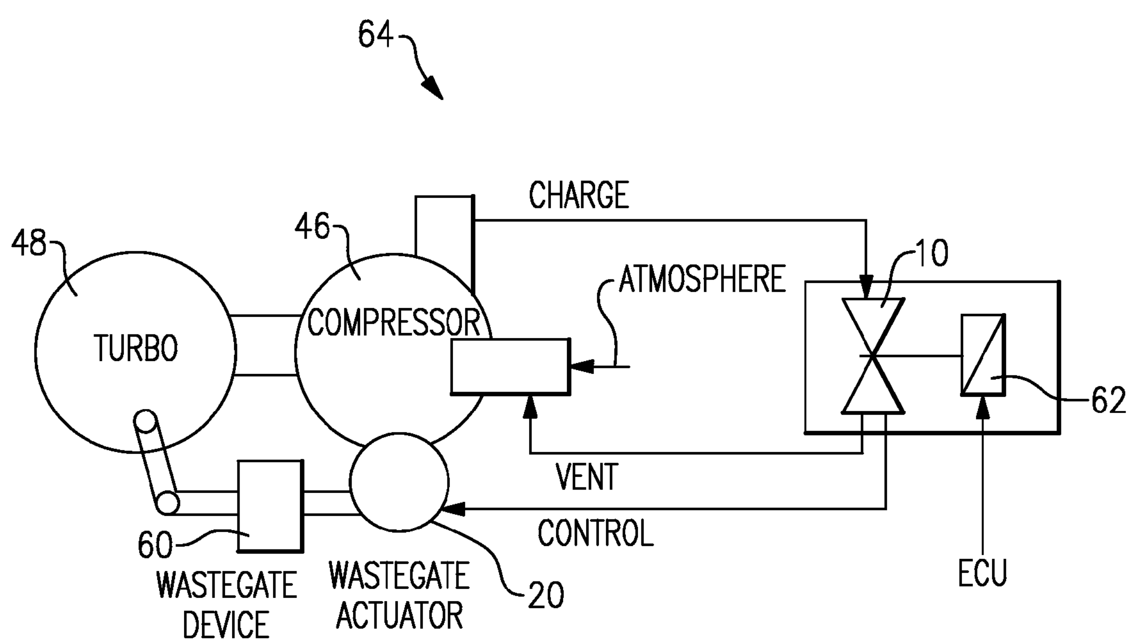
FIG. 3 is a partial block diagram of a system utilizing the turbo control valve of the present invention.

Referring to FIG. 3, a partial block diagram of a system 64 utilizing the valve 10 of the current invention is shown. The valve 10 is located between the compressor 46 and the wastegate actuator 20. The compressor 42, wastegate actuator 16 and atmospheric 22 ports are connected in fluid communication with the compressor 46, the wastegate actuator 20 and atmosphere, respectively. In one embodiment, the valve 10 is controlled by an engine control unit (ECU) 62 to operate on an approximately 32 Hz pulse width modulated input signal, operating between 0-100% duty cycle. Varying the duty cycle will affect the amount of time that the valve 10 is energized, thus achieving regulation of the pressure received by the wastegate actuator 20.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A valve for controlling a wastegate actuator of a turbocharger having a compressor, comprising:

a bobbin having a coil for generating a magnetic field;

a stator extending through said bobbin, said stator including a top portion and an internal channel;

a housing having a compressor port, wastegate actuator port and an atmospheric port which are in fluid communication with said compressor, said wastegate actuator and atmosphere, respectively and wherein said compressor port and said wastegate actuator port are in fluid communication with each other; and a pair of walls extending from said housing for enabling movement of a permanent magnet between a first position with the coil not energized such that a magnetic attraction is formed between said top portion and said permanent magnet causing said permanent magnet to contact said top portion to seal said internal channel thus enabling substantially equal boost pressure levels in said compressor and said wastegate actuator ports and a second position wherein the coil is energized to generate a magnetic field for repelling said permanent magnet and moving said permanent magnet to a position above said top portion to thus unseal said top portion and said internal channel to enable a portion of said boost pressure level to be vented to atmosphere, wherein the permanent magnet moves from the second position back to the first position when the coil is not energized.

2. The valve according to claim 1, wherein said permanent magnet is disc shaped.

3. The valve according to claim 1, wherein said permanent magnet is guided by arcuately shaped walls.

4. The valve according to claim 1, wherein said stator is fabricated from a steel.

5. The valve according to claim 1, wherein when said boost pressure level is vented to atmosphere, said wastegate actuator receives a reduced pressure level for controlling a wastegate.

6. A method for operating a valve for controlling a wastegate actuator of a turbocharger having a compressor, comprising the steps of:

providing a permanent magnet for magnetically attracting a permanent magnet to a stator having an internal channel;

sealing said internal channel through contact between said permanent magnet and said stator thus enabling substantially equal boost pressure levels in compressor and wastegate actuator ports;

generating a magnetic field for repelling said permanent magnet to unseal said internal channel to enable a portion of said boost pressure level to be vented to atmosphere through an atmospheric port; and returning the permanent magnet to seal against the stator in response to de-energizing the magnetic field.

7. The method according to claim 6, wherein said permanent magnet is disc shaped.

8. The method according to claim 6, further including the step of guiding said permanent magnet by using arcuately shaped walls.

9. The method according to claim 6, further including the step of providing a reduced boost pressure level to said wastegate actuator.

* * * * *